(12) United States Patent
Afrasiabi

(10) Patent No.: US 12,386,962 B2
(45) Date of Patent: Aug. 12, 2025

(54) ADVERSARIAL ATTACK DETECTION AND AVOIDANCE IN COMPUTER VISION

(71) Applicant: THE BOEING COMPANY, Arlington, VA (US)

(72) Inventor: Amir Afrasiabi, Fircrest, WA (US)

(73) Assignee: The Boeing Company, Arlington, VA (US)

(*) Notice: Subject to any disclaimer, the term of this patent is extended or adjusted under 35 U.S.C. 154(b) by 202 days.

(21) Appl. No.: 18/177,707

(22) Filed: Mar. 2, 2023

(65) Prior Publication Data
US 2024/0296225 A1 Sep. 5, 2024

(51) Int. Cl.
| | |
|---|---|
| G06F 18/21 | (2023.01) |
| G06F 18/20 | (2023.01) |
| G06F 21/56 | (2013.01) |
| G06V 10/774 | (2022.01) |
| G06V 10/86 | (2022.01) |

(52) U.S. Cl.
CPC .......... *G06F 21/566* (2013.01); *G06V 10/774* (2022.01); *G06V 10/86* (2022.01); *G06F 2221/034* (2013.01); *G06V 2201/10* (2022.01)

(58) Field of Classification Search
CPC ............ G06F 21/566; G06F 2221/034; G06V 2201/10
USPC ...................................... 726/22–23
See application file for complete search history.

(56) References Cited

U.S. PATENT DOCUMENTS

| | | | |
|---|---|---|---|
| 10,867,444 B2* | 12/2020 | Russell | G06V 20/70 |
| 11,100,368 B2* | 8/2021 | Chu | G06V 10/764 |
| 12,069,077 B2* | 8/2024 | Armelin | H04L 63/1408 |
| 2020/0151505 A1* | 5/2020 | Saito | G06F 18/214 |
| 2020/0349414 A1 | 11/2020 | Bazhenov et al. | |
| 2022/0101304 A1* | 3/2022 | Kang | G06Q 20/3276 |
| 2023/0115046 A1* | 4/2023 | Karta | H04L 63/1483 |
| | | | 726/23 |
| 2023/0269263 A1* | 8/2023 | Yarabolu | G06F 18/2155 |
| | | | 726/22 |
| 2024/0096105 A1* | 3/2024 | Zhao | G06V 10/44 |
| 2024/0214404 A1* | 6/2024 | Sharma | G06F 21/55 |
| 2024/0248958 A1* | 7/2024 | Soryal | G06V 10/82 |
| 2024/0355107 A1* | 10/2024 | Liba | G06V 10/462 |
| 2024/0407663 A1* | 12/2024 | Pietsch | G06T 5/90 |

OTHER PUBLICATIONS

European Patent Office, Extended European Search Report for European Patent Application No. 24150718.5, dated May 8, 2024.
(Continued)

*Primary Examiner* — Bharat Barot
(74) *Attorney, Agent, or Firm* — Alleman Hall & Tuttle LLP

(57) ABSTRACT

Techniques for adversarial attack avoidance for machine learning (ML) are disclosed. These techniques include receiving one or more images at a trained ML model and receiving attack data at the ML model. The techniques further include predicting an object depicted in the one or more images using the ML model, based on the one or more images, metadata relating to the one or more images, and the attack data. The ML model uses the metadata to prevent the attack data from changing a result of the predicting.

20 Claims, 8 Drawing Sheets

(56) References Cited

OTHER PUBLICATIONS

Renu Gopal Mani: "A Survey on Digital Image Forensics: Metadata and Image forgeries", CEUR Workshop Proceedings (CEUR-WS.org), Jan. 27, 2022 (Jan. 27, 2022), XP0931 53340, Retrieved from the Internet: URL:https://ceur-ws.orgNol-3142/PAPER_03.pdf.
Zhao Yifan et al: "Graph-based High-Order Relation Discovery for Fin•• grained Recognition", 2021 IEEE/CVF Conference on Computer Vision and Pattern Recognition (CVPR), IEEE, Jun. 20, 2021 (Jun. 20, 2021), pp. 15074-15083, XP034010777, DOI: 10.1109/CVPR46437.2021.01483 [retrieved on Oct. 15, 2021].
Wang Chuanming et al: "Global Structure Graph Guided Fine-Grained Vehicle Recognition", ICASSP 2020—2020 IEEE International Conference on Acoustics, Speech and Signal Processing (Icassp), IEEE, May 4, 2020 (May 4, 2020), pp. 1913-1917, XP033792575, DOI: 10.1109/ICASSP40776.2020.9052902 [retrieved on Apr. 1, 2020].
Anonymous: "Adversarial machine learning—Wikipedia", XP093153248, Retrieved from the Internet: URL:https://en.wikipedia.org/wiki/Adversarial_machine_learning.

\* cited by examiner

ND AVOIDANCE IN COMPUTER VISION

INTRODUCTION

Aspects of the present disclosure relate to machine learning (ML), and more specifically to adversarial attack avoidance for ML.

Adversarial attacks in ML are generally inputs that are intentionally provided to an ML model with the purpose of confusing the model (e.g., confusing a neural network). This can result in errors, including misclassification of a given input. For example, adversarial attacks can lead to misclassifications suggesting false positive or false negative values, which can have substantial consequences. This is particularly problematic for important applications, including medical applications, autonomous vehicle operation, and numerous other important applications. For example, autonomous attacks in computer vision ML models can result in catastrophic damages in autonomous and robotic applications, as well as security and surveillance systems.

BRIEF SUMMARY

Embodiments include a method. The method includes receiving one or more images at a trained ML model. The method further includes receiving attack data at the ML model. The method further includes predicting an object depicted in the one or more images using the ML model, based on the one or more images, metadata relating to the one or more images, and the attack data. The ML model uses the metadata to prevent the attack data from changing a result of the predicting.

Embodiments further include a non-transitory computer-readable medium containing computer program code that, when executed by operation of one or more computer processors, performs operations. The operations include receiving one or more images at a trained ML model. The operations further include receiving attack data at the ML model. The operations further include predicting an object depicted in the one or more images using the ML model, based on the one or more images, metadata relating to the one or more images, and the attack data. The ML model uses the metadata to prevent the attack data from changing a result of the predicting.

Embodiments further include a system, including a computer processor, and a memory having instructions stored thereon which, when executed on the computer processor, performs operations. The operations include receiving one or more images at a trained ML model. The operations further include receiving attack data at the ML model. The operations further include predicting an object depicted in the one or more images using the ML model, based on the one or more images, metadata relating to the one or more images, and the attack data. The ML model uses the metadata to prevent the attack data from changing a result of the predicting.

Embodiments further include any of the embodiments described above, wherein the attack data includes adversarial attack data intended to change the predicting of the object by the ML model.

Embodiments further include any of the embodiments described above, wherein the ML model is trained using a combination of training images depicting objects and metadata relating to the training images.

Embodiments further include any of the embodiments described above, wherein the ML model is trained using a multi-dimensional array relating to the training images and the metadata.

Embodiments further include any of the embodiments described above, wherein the metadata includes temporal metadata relating to additional images of the object captured over time.

Embodiments further include any of the embodiments described above, wherein the temporal metadata further includes images depicting multiple views of the object.

Embodiments further include any of the embodiments described above, wherein the metadata includes a graph relating to the object depicted in the one or more images.

Embodiments further include any of the embodiments described above, wherein the graph includes a plurality of vertices and edges relating to sub-components of the object.

Embodiments further include any of the embodiments described above, wherein the graph is generated using a second ML model to identify the sub-components.

Embodiments further include any of the embodiments described above, wherein the graph is further generated based on identify bounding boxes for each of the sub-components and calculating a respective centroid for each bounding box, each of the vertices in the graph relating to one or more of the centroids.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
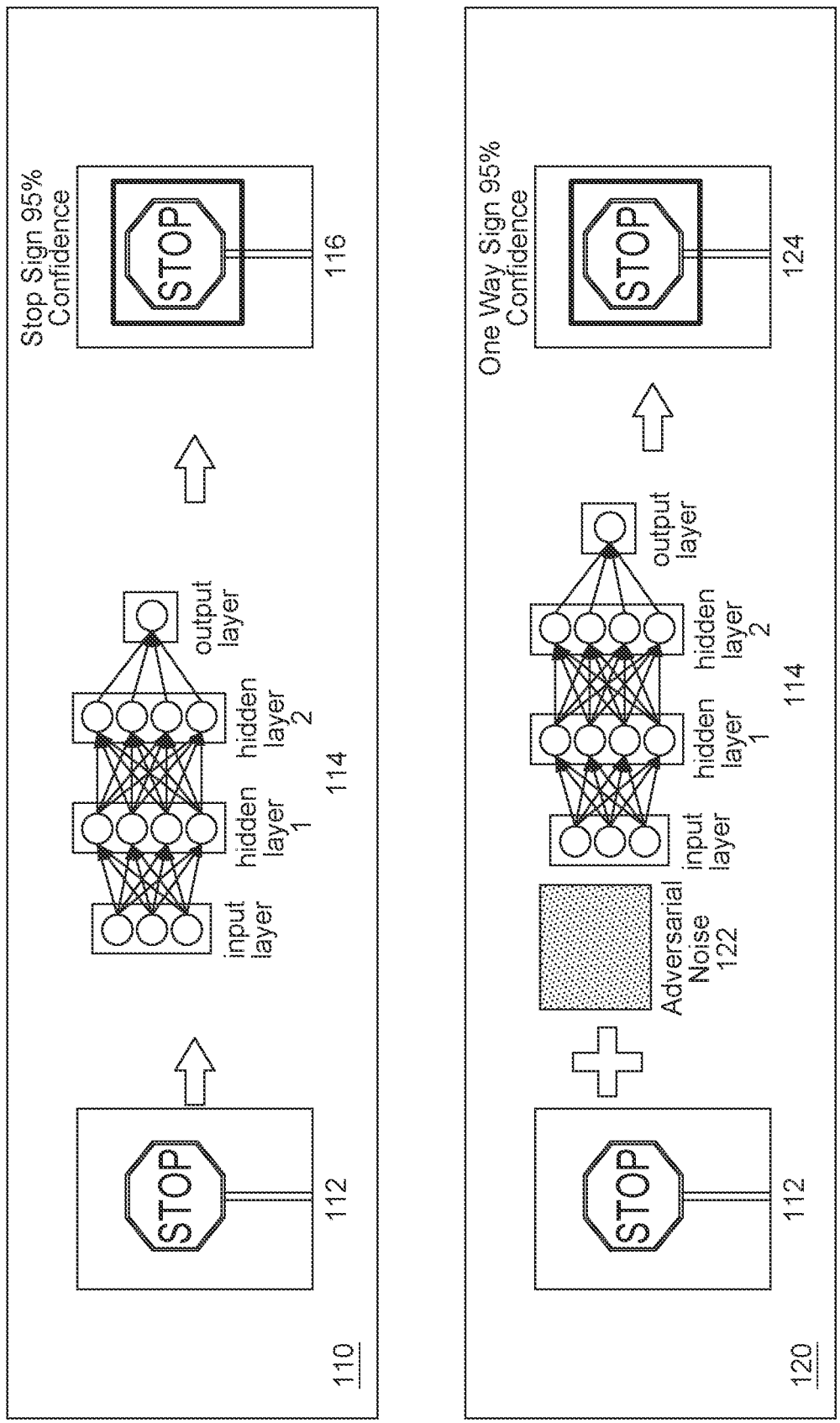
FIG. 1A illustrates adversarial attack for a computer vision ML system, according to one embodiment.

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Existing solutions for adversarial defense for ML models (e.g., neural networks) typically focus on fine-tuning the models themselves. For example, the paper Denoising and Verification Cross-Layer Ensemble Against Black-box Adversarial Attacks, by K. Chow, W. Wei, Y. Wu, and K. Liu, in 2019 IEEE International Conference on Big Data, pp. 1282-1291. IEEE, 2019 (hereinafter the "Chow Paper"), discusses improvements to the convolutional layers in deep neural networks (DNN) to reduce the impact of adversarial attacks. This is discussed further, below, with regard to FIG. 1B.

But this does not solve the root problem of adversarial attacks, which is the training datasets used to train ML models. One or more techniques disclosed herein prevent adversarial attacks by providing additional metadata to the training dataset (e.g., temporal metadata or object related metadata for computer vision). This means that even if an adversarial attack occurs (e.g., during inference) the ML model has been trained to identify any misclassification (e.g., false positives or negatives) by matching the classification output to the data point's associated metadata. In an embodiment, this can be used to prevent both targeted adversarial attacks (e.g., attacks intended to make an ML model M misclassify an object X as a class Y)) and untargeted adversarial attacks (e.g., attacks intended to make the model M misclassify any object classes).

In an embodiment, adding metadata during training, as discussed with regard to one or more embodiments below, trains the ML model to utilize human-style rule-based judgment for verifying the classification results. This has numerous advantages, including robustness against adversarial attack for a wide variety of different ML applications. Further, one or more of these techniques can help with prediction of sub-components that are missing (e.g., false negatives) or misclassified (false positives). They can also reduce the size of training datasets and data storage. For example, one or more of these techniques can use a graph representation for image data (i.e., for computer vision) instead of using full size images. Further, the techniques disclosed herein can be used for a wide variety of applications, including motion detection and activity alert systems, visual search engines and visual question and answer systems, visual quality inspection, and a wide variety of other applications.

FIG. 1A illustrates adversarial attack for a computer vision ML system, according to one embodiment. In an embodiment, a flow 110 illustrates a computer vision prediction without adversarial attack. An ML model 114 (e.g., a DNN) receives an image 112 as input. The ML model 114 generates a prediction 116. The prediction 116 accurately predicts that the image 112 depicts a stop sign, and has a 95% confidence in this prediction.

In an embodiment, a flow 120 illustrates a computer vision prediction with adversarial attack. A same image 112 is provided to a same ML model 114. In addition, however, adversarial noise 122 is also added as input to the ML model 114. In an embodiment, the adversarial noise 122 greatly harms the performance of the ML model 114. As illustrated, the adversarial noise 122 causes the ML model 114 to generate a different prediction. The prediction 124 incorrectly predicts that the image 112 depicts a one-way sign, with 95% confidence. One or more techniques described below in relation to FIGS. 3A-6 provide a solution to improve the performance of an ML model (e.g., the ML model 114) when faced with adversarial attack.

Figure 1B:
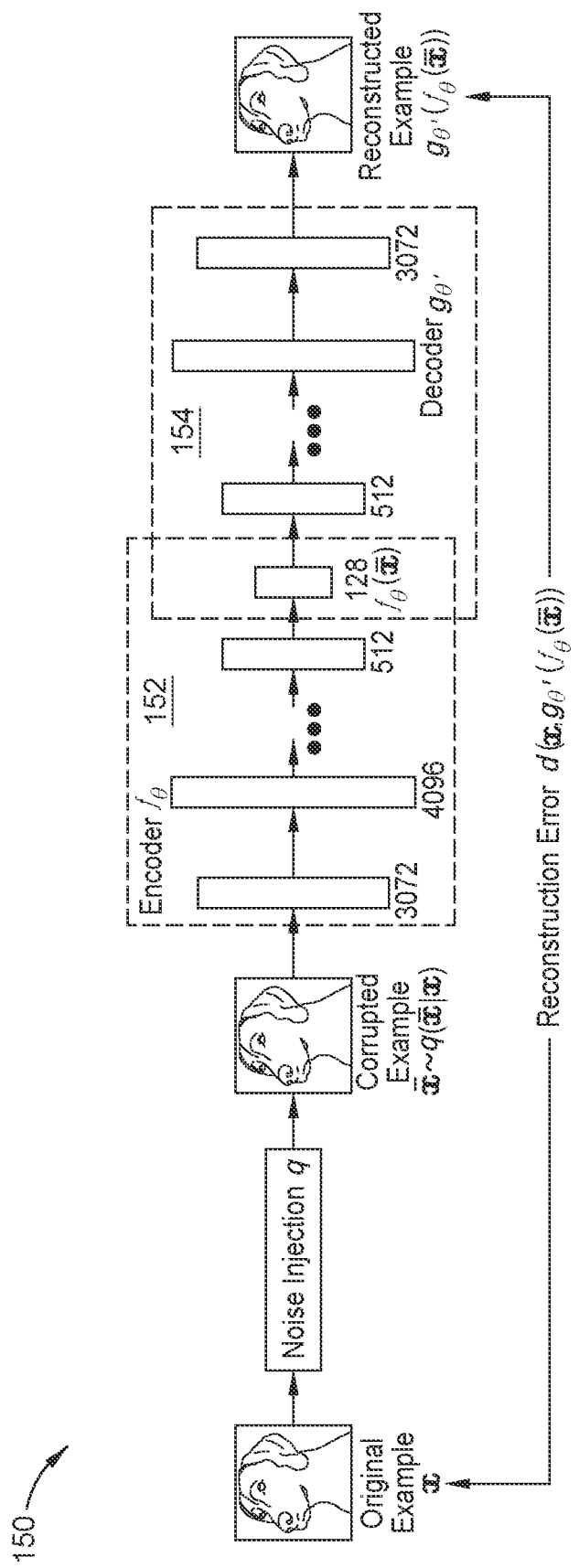
FIG. 1B illustrates one solution to adversarial attack for a computer vision ML system, according to one embodiment.

FIG. 1B illustrates one solution 150 to adversarial attack for a computer vision ML system, according to one embodiment. In an embodiment, the solution 150 is a prior art solution described in the Chow Paper discussed above. As illustrated, the solution 150 proposes revisions to the convolutional layers inside a DNN. For example, a number of denoising encoders 152 and decoders 154 can be trained (e.g., using corrupted data examples) to remove the adversarial effect of noise provided in an adversarial attack. But this not ideal, because it requires modifications to the ML model itself and is tied to specific types of adversarial attacks and specific model constructions. FIGS. 3-6, below, discuss one or more embodiments for improved solutions that are robust against adversarial attack for a wide variety of different ML applications and attacks.

Figure 2:
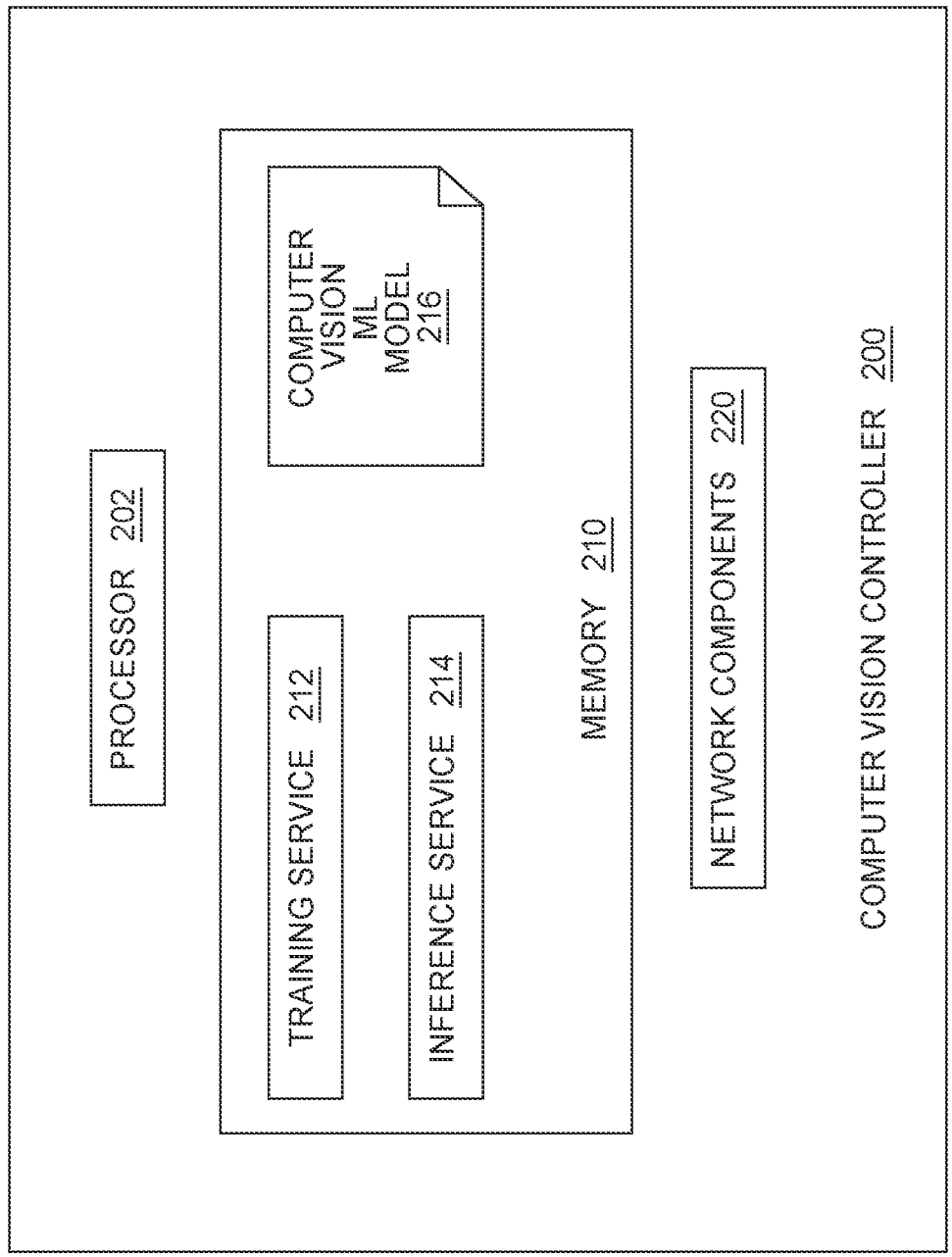
FIG. 2 is a block diagram illustrating a computer vision controller for adversarial attack avoidance for ML, according to one embodiment, according to one embodiment.

FIG. 2 is a block diagram illustrating a computer vision controller 200 for adversarial attack avoidance for ML, according to one embodiment. In an embodiment, the computer vision controller 200 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for computer vision controller 200 to interface with a suitable communication network. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the computer vision controller 200. The program code is generally described as various functional "applications" or "modules" within the memory 210, although alternate implementations may have different functions and/or combinations of functions. Within the memory 210, a training service 212 facilitates training a computer vision ML model 216 (e.g., an object classification ML model). In an embodiment, the computer vision ML model 216 is any suitable ML model, including a neural network (e.g., a DNN) or any other suitable ML model. An inference service 214 facilitates using the computer vision ML model 216 to predict what is depicted by an input image. These are described further, below, with regard to FIGS. 3A-6.

Although FIG. 2 depicts the training service 212, inference service 214, and computer vision ML model 216, as located in the memory 210, that representation is merely provided as an illustration for clarity. More generally, the computer vision controller 200 may include one or more computing platforms, such as computer servers for example, which may be co-located, or may form an interactively linked but distributed system, such as a cloud-based system (e.g., a public cloud, a private cloud, a hybrid cloud, or any other suitable cloud-based system). As a result, the processor 202 and the memory 210 may correspond to distributed processor and memory resources within a computing environment. Thus, it is to be understood that any, or all, of the training service 212, inference service 214, and computer vision ML model 216 may be stored remotely from the computer vision controller 200 within the distributed memory resources of a computing environment.

Figure 3A:
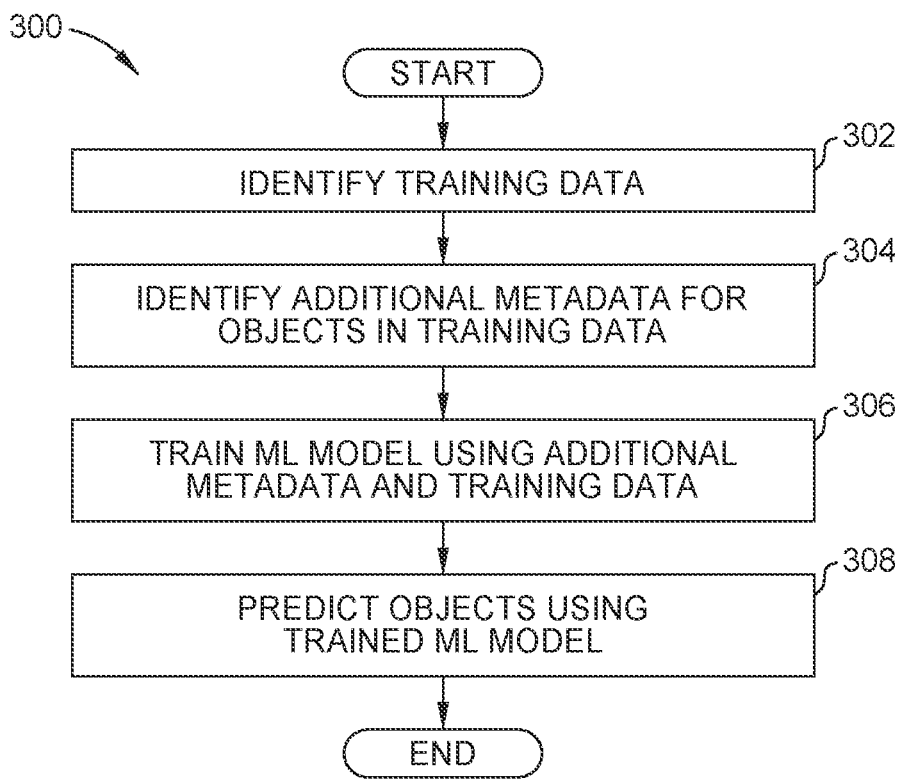
FIG. 3A is a flowchart illustrating training an ML model for adversarial attack avoidance, according to one embodiment.

FIG. 3A is a flowchart 300 illustrating training an ML model for adversarial attack avoidance, according to one embodiment. At block 302 a training service (e.g., the training service 212 illustrated in FIG. 2), a human administrator, or any suitable entity, identifies training data. For example, the training service can train a computer vision ML model (e.g., the computer vision ML model 216) using suitable training data. The training data can include suitable labeled images of objects used for training the computer vision ML model.

At block 304, the training service identifies additional metadata for objects in the training data. In an embodiment, the training data includes labeled objects depicted in images. In existing solutions, this training data is used to train the computer vision ML model. However, as discussed above in relation to FIGS. 1A-B, a computer vision ML model trained with typical training data is potentially vulnerable to adversarial attack.

In an embodiment, the training service improves robustness to adversarial attack for the computer vision ML model by using additional metadata for objects in the training data. For example, the training service can identify additional temporal data depicting the objects over time. This temporal data can include, for example, images of objects taken in successive images over a period of time. This temporal data can be used as metadata to train the computer vision ML model to identify errors during inference, making the computer vision ML model more robust to adversarial attack. This is discussed further, below, with regard to FIGS. 4-5B.

As another example, the training service can generate additional metadata reflecting the relationships between objects in a single image. For example, an image used for training the computer vision ML model may depict multiple objects, or may depict a single object that can be broken up into sub-components. The training service can generate additional metadata based on the relationships between these objects or sub-components of objects (e.g., based on generating a graph representation of the objects or sub-components). The training service can train the computer vision ML model using this additional metadata, making the computer vision ML model more robust to adversarial attack. This is discussed further, below, with regard to FIG. 6.

At block 306, the training service trains an ML model using the additional metadata and the training data. For example, the training service can train the ML model using both temporal metadata (e.g., reflecting multiple images of an object over time) and typical training data. This is discussed further, below, with regard to FIGS. 4-5B. As another example, the training service can train the ML model using both object metadata (e.g., based on generating a graph representation of the object(s) depicted in training data) and typical training data. This is discussed further, below, with regard to FIG. 6.

At block 308, an inference service (e.g., the inference service 214 illustrated in FIG. 2) predicts objects using the trained ML model. For example, the computer vision ML model can be trained using the techniques discussed above in relation to blocks 302-306. The inference service can then use the trained computer vision ML model to predict what is depicted in images. This is discussed further, below, with regard to FIG. 3B.

For example, the computer vision ML model can be trained using temporal metadata reflecting images of an object taken over a period of time. The inference service can receive as input multiple images of an object, and can use the computer vision ML model to predict the objects depicted in the images. In an embodiment, the computer vision ML model is significantly more robust to adversarial attack because of the use of the additional temporal metadata during training.

As another example, the computer vision ML model can be trained using object relationship metadata (e.g., reflecting a graph relationship of object(s) depicted in an image). The inference service can receive as input an image of one or more objects, and can use the computer vision ML model to predict the objects depicted in the image. In an embodiment, the computer vision ML model is significantly more robust to adversarial attack because of the use of the additional object relationship metadata during training.

Figure 3B:
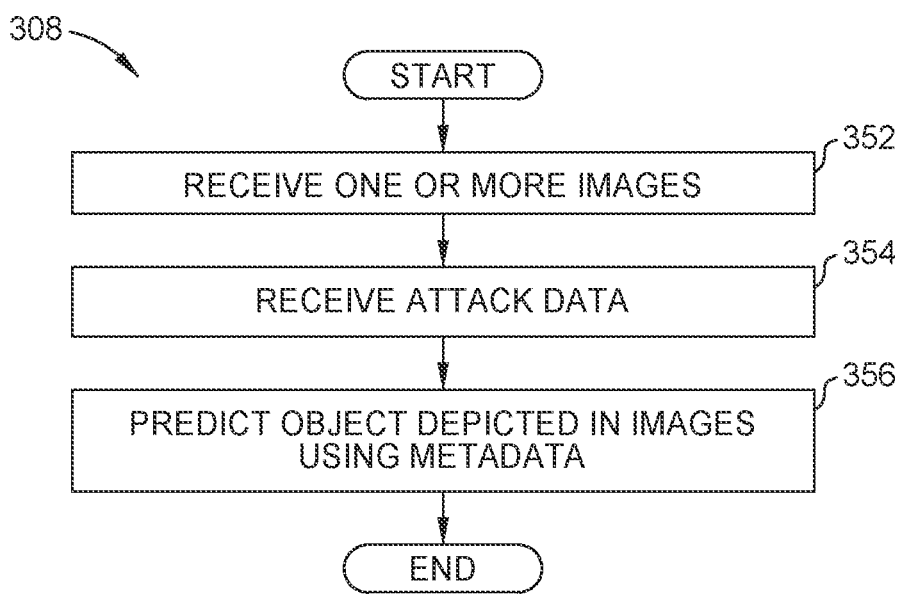
FIG. 3B is a flowchart illustrating inference using an ML model for adversarial attack avoidance, according to one embodiment.

FIG. 3B is a flowchart illustrating inference using an ML model for adversarial attack avoidance, according to one embodiment. In an embodiment, FIG. 3B corresponds with block 308 discussed above in relation to FIG. 3A. At block 352, an inference service (e.g., the inference service 214 illustrated in FIG. 2) receives one or more images. For example, the inference service can receive one more images for prediction of objects depicted in the images, using a computer vision ML model (e.g., the computer vision ML model 216 illustrated in FIG. 2).

At block 354, the inference service receives attack data. For example, as discussed above in relation to FIG. 1A, adversarial attack data can be provided to the computer vision ML model to change the prediction made by the ML model. In an embodiment, the adversarial attack data is intentionally provided to reduce the accuracy of predictions made by the ML model.

At block 356, the inference service predicts objects depicted in the images using metadata. For example, as described above in relation to FIG. 3A, the computer vision ML model can be trained to use metadata relating to the input images to avoid inaccuracies caused by the attack data. This can be temporal metadata (e.g., as discussed below in relation to FIGS. 4-5B), object graph metadata (e.g., as discussed below in relation to FIG. 6), or any other suitable metadata. In an embodiment, the ML model uses the metadata to prevent the attack data from changing the result of the predicting. For example, without the metadata the ML model prediction would be changed by the attack data (e.g., could become inaccurate). But with the metadata, the ML model prediction is robust to adversarial attack and is not changed by the attack data.

Figure 4:
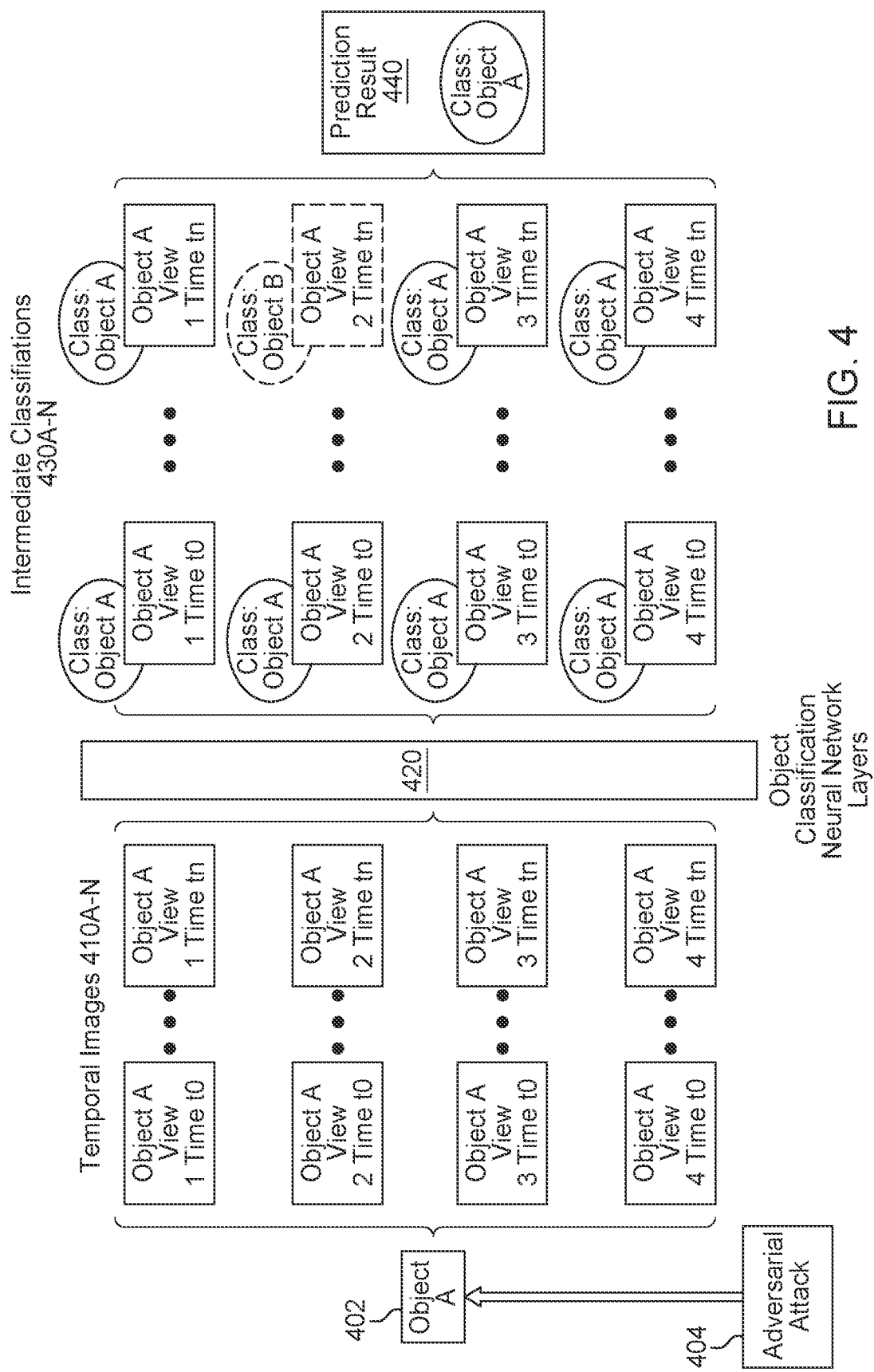
FIG. 4 illustrates using temporal metadata for adversarial attack avoidance for ML, according to one embodiment.

FIG. 4 illustrates using temporal metadata for adversarial attack avoidance for ML, according to one embodiment. In an embodiment, a computer vision ML model (e.g., the computer vision ML model 216) is used to classify an object 402 (e.g., an object A) depicted in a series of images 410A-N. For example, a series of temporal images 410A-N depict an object A from multiple views, over a time period $t_0 \to t_n$. As illustrated in FIG. 4, the object A is depicted in four views over this time period, and each view includes multiple images taken over a period of time (e.g., an image taken every second from each of four views, every few seconds, or at any other suitable interval). The different views can reflect different image capture devices (e.g., different cameras) capturing the object A from different locations or angles over the time period $t_0 \to t_n$. This is merely an example, and any suitable number of views can be used. For example, one view could be used, more than four views could be used, or any other suitable number of views could be used. Further, the time period $t_0 \to t_n$ can reflect any suitable duration and the temporal images can reflect any suitable number of images of each view.

In an embodiment, the temporal images 410A-N are used by object classification neural network layers 420 to generate intermediate classifications 430A-N and an eventual prediction result 440. For example, the computer vision ML model can be an object classification neural network made up of a series of layers 420 (e.g., convolutional layers). These layers 420 can be used to generate the intermediate classifications 430A-N and the eventual prediction result 440.

In an embodiment, an adversarial attack 404 is also provided to the computer vision ML model. For example, the adversarial attack 404 can be provided as input to the object classification neural network layers 420, along with the temporal images 410A-N. As illustrated, the adversarial attack changes one of the intermediate classifications 430A-N. The object classification neural network layers 420 classify the images of view 1 from time $t_0 \to t_n$ as depicting the object A. Similarly, the object classification neural network layers 420 classify the images of views 3 and 4 from time $t_0 \to t_n$ as depicting the object A. But the adversarial attack 404 causes the object classification neural network layers 420 to classify the images of view 2 from time $t_0 \to t_n$ as depicting an object B. This is an error, caused by the adversarial attack 404.

In an embodiment, however, the computer vision ML model is trained using temporal metadata (e.g., as discussed above in relation to FIG. 3) to be robust to adversarial attack. The trained object classification neural network layers 420 thus identify the classification of object B as conflicting with the classifications of object A (e.g., from other temporal images). The prediction result 440 remains a correct prediction of object A, despite the adversarial attack 404.

In an embodiment, the temporal images 410A-N are combined into a single training data set (e.g., a single tensor file). Further, each of the temporal images 410A-N can be associated with a timestamp identifying the time at which the respective image was captured. This can allow the trained computer vision ML model to identify the ordering of the images and that corresponding views reflect differing views of a same object at corresponding times.

Figure 5A:
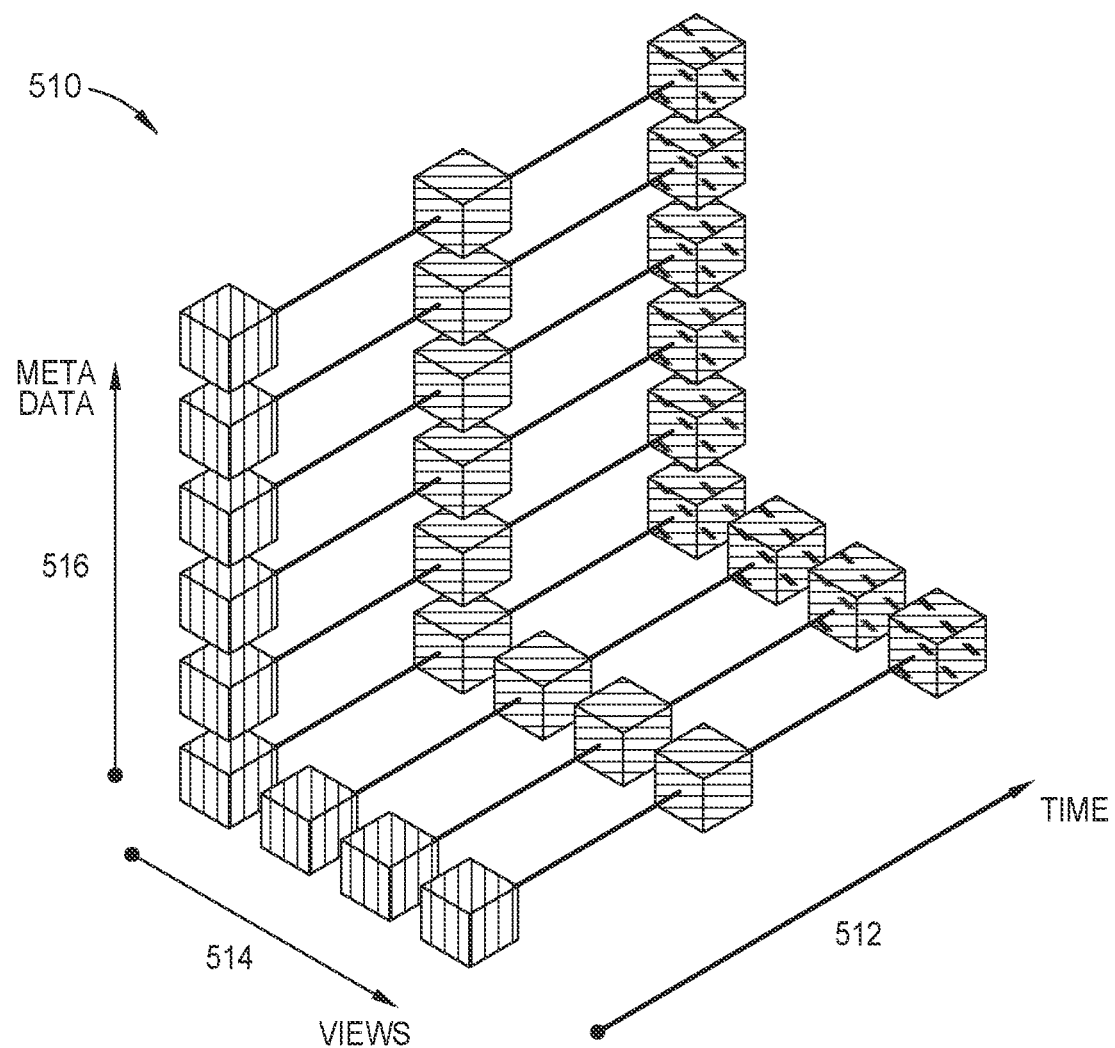
FIG. 5A illustrates a metadata array for generating temporal metadata for adversarial attack avoidance for ML, according to one embodiment.

FIG. 5A illustrates a metadata array 510 for generating temporal metadata for adversarial attack avoidance for ML, according to one embodiment. In an embodiment, a training service (e.g., the training service 212 illustrated in FIG. 2) forms collected data into an n-dimensional array of metadata and time stamped data. As discussed below in relation to FIG. 5B, metadata for each captured image can be extracted and recorded as a series of edges (e.g., edges in a graph) describing the relationships between objects and object components in an image.

The metadata array 510 includes three dimensions: a time axis 512, a view axis 514, and a metadata axis 516. The time axis 512 and view axis 514 can, for example, correspond to temporal images (e.g., the temporal images 410A-N illustrated in FIG. 4). That is, each entry in the metadata array 510 can relate to an image captured at a particular time from a particular view. The metadata axis 516 reflects extracted metadata for each of these images. For example, the metadata axis 516 can reflect graph edges and vertices representing the object(s) depicted in the images captured at the particular times from the respective views represented along the axes 512 and 514.

Figure 5B:
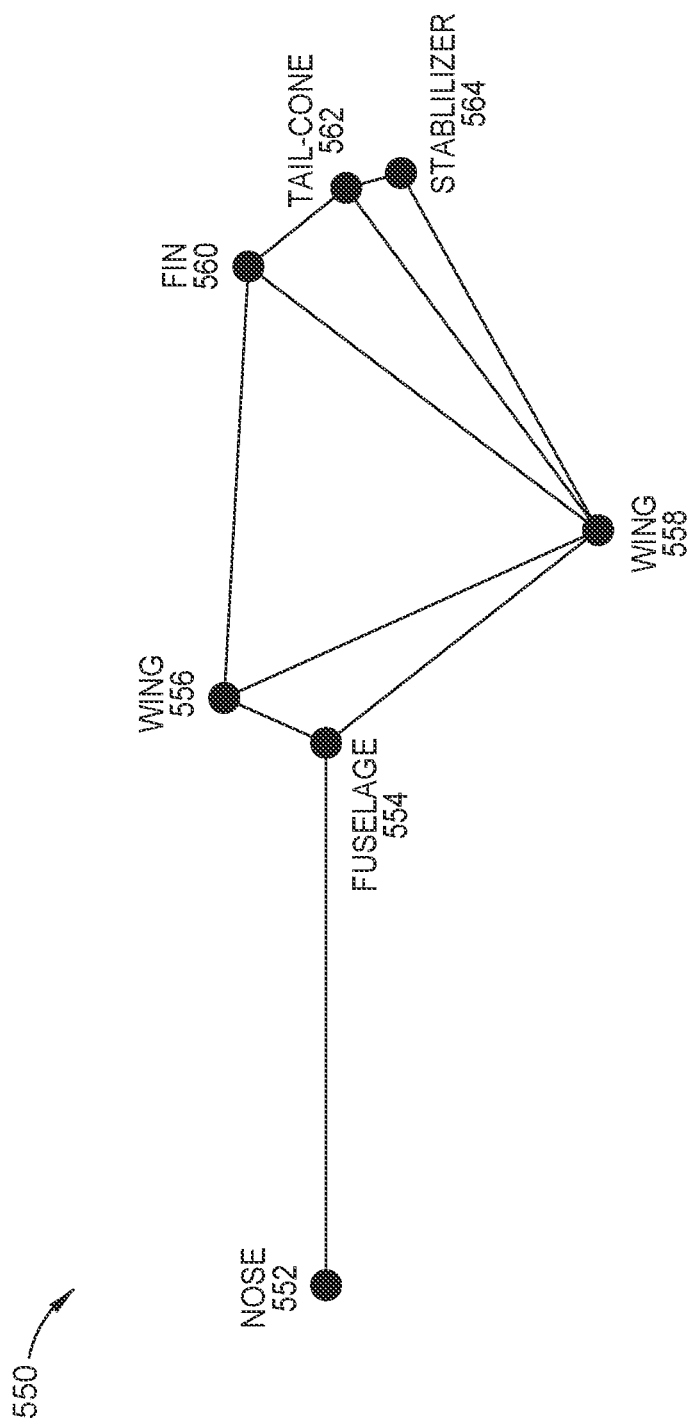
FIG. 5B illustrates a metadata graph for generating temporal metadata for adversarial attack avoidance for ML, according to one embodiment.
Figure 6:
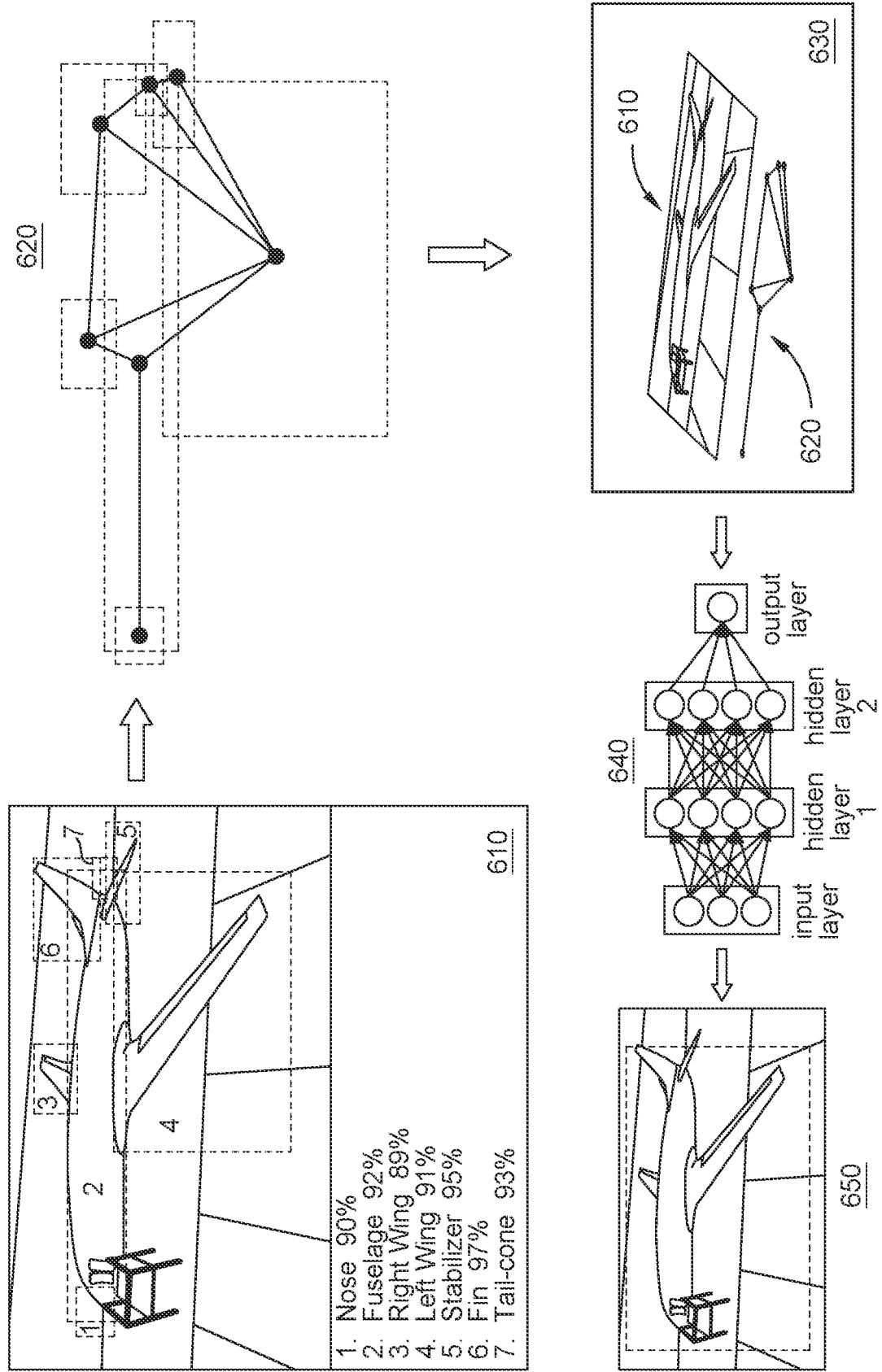
FIG. 6 illustrates generating sub-component metadata for adversarial attack avoidance for ML, according to one embodiment.

FIG. 5B illustrates a metadata graph 550 for generating temporal metadata for adversarial attack avoidance for ML, according to one embodiment. In an embodiment, each vertex in the metadata graph 550 reflects a sub-component of an object in an image, and the edges between vertices reflect relationships between these sub-components. FIG. 6, below, describes one example technique to generate the metadata graph 550. Further, the metadata axis 516 in the array 510, discussed above with regard to FIG. 5A, can reflect a metadata graph corresponding to each captured image.

For example, the metadata graph 550 can correspond to an aircraft depicted in a captured image. The vertex 552 can correspond to a nose of the aircraft, the vertex 554 can correspond to a fuselage of the aircraft, the vertices 556 and 558 can correspond to the respective wings of the aircraft, the vertex 560 can correspond to a fin of the aircraft, the vertex 562 can correspond to the tail-cone of the airplane, and the vertex 564 can correspond to a stabilizer of the aircraft. In an embodiment, the edges between the vertices 552-564 reflect the relationships between these components of the aircraft. The metadata axis 516 in FIG. 5B can represent these vertices and edges for each of the captured images (e.g., the images captured from the various views over time).

In an embodiment, using the metadata array 510 illustrated in FIG. 5A increases the robustness of a computer vision ML model to adversarial attack. For example, an adversarial attack could affect all views of an object. The metadata reflected along the metadata axis 516 in the metadata array 510 allows the computer vision ML model to identify the inconsistency of the adversarial attack with the relationship among object sub-components, making the computer vision ML model significantly more robust to adversarial attack.

FIG. 6 illustrates generating sub-component metadata for adversarial attack avoidance for ML, according to one embodiment. An image 610 depicts an object. As illustrated, the image 610 depicts an aircraft in a maintenance facility (e.g., an aircraft undergoing manufacture or maintenance). The aircraft is made up of a number of sub-components.

In an embodiment, a training service (e.g., the training service 212 illustrated in FIG. 2) identifies these sub-components. For example, the training service can use a suitable object detection ML model (e.g., a DNN trained for object detection using any suitable techniques) to detect the sub-components. For example, the training service can identify sub-component 1 as the nose of the aircraft (e.g., with 90% confidence), sub-component 2 as the fuselage of the aircraft (e.g., with 92% confidence), sub-component 3 as the right wing of the aircraft (e.g., with 89% confidence), sub-component 4 as the left wing of the aircraft (e.g., with 91% confidence), sub-component 5 as a stabilizer for the aircraft (e.g., with 95% confidence), sub-component 6 as a fin of the aircraft (e.g., with 97% confidence), and sub-component 7 as a tail-cone of the aircraft (e.g., with 93% confidence). These are merely examples, and any suitable technique can be used to identify any suitable sub-components.

In an embodiment, the training service identifies bounding boxes for the various sub-components (e.g., using the object detection ML model) and calculates the centroid of each bounding box. The training service can then generate a graph representation 620 of the object. In an embodiment, the graph representation 620 includes vertices representing the centroids of the bounding boxes and edges connecting the vertices. This graph representation 620 can be used as metadata for training an ML model that is robust to adversarial attack. For example, the graph representation 620 illustrates one technique to create the metadata graph 550 illustrated in FIG. 5B.

In an embodiment, the training service stacks the source image 610 and the graph representation 620 to generate stacked training data 630. The graph representation 620 acts as metadata for the source image 610. The stacked training data 630 can then be used to train a computer vision ML model (e.g., a DNN) 640 (e.g., the computer vision ML model 216 illustrated in FIG. 2). The trained computer vision ML model 640 can then be used to predict objects in one or more images 650. The inclusion of the graph representation 620 along with the source image 610 allows the trained computer vision ML model to identify inaccuracies caused by adversarial attack, and makes the trained computer vision ML model robust to adversarial attack.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving, from a computing system implementing a machine learning (ML) model, one or more images depicting an object, wherein the ML model is trained using training data representing the object and additional training metadata relating to the object, the additional training metadata comprising temporal metadata that includes two or more training images depicting the object at different times;
receiving, from the computing system, attack data at the ML model; and
outputting, to the computing system, an object classification of the object depicted in the one or more images predicted using the ML model, based on the one or more images, the additional training metadata, and the attack data;
wherein the ML model uses the additional training metadata to prevent the attack data from changing the object classification of the object.

2. The method of claim 1, wherein the attack data comprises adversarial attack data intended to change the object classification of the object by the ML model.

3. The method of claim 1, wherein the ML model is trained using a multi-dimensional array relating to the training data and the additional training metadata.

4. The method of claim 1, wherein the additional training metadata further comprises object relationship data for the object.

5. The method of claim 4, wherein the object relationship data comprises a graph relating to the object depicted in the one or more images.

6. The method of claim 5, wherein the graph comprises a plurality of vertices and edges relating to sub-components of the object.

7. The method of claim 6, wherein the graph is generated using a second ML model to identify the sub-components.

8. The method of claim 7, wherein the graph is further generated by identifying bounding boxes for each of the sub-components and calculating a respective centroid for each bounding box, each of the vertices in the graph relating to one or more of the centroids.

9. A non-transitory computer-readable medium including computer program code that, when executed by operation of one or more computer processors, performs operations comprising:
   receiving, from a computing system implementing a machine learning (ML) model, one or more images depicting an object wherein the ML model is trained using training data representing the object and additional training metadata relating to the object, the additional training metadata comprising temporal metadata that includes two or more training images depicting the object at different times;
   receiving, from the computing system, attack data at the ML model; and
   outputting, to the computing system, an object classification of the object depicted in the one or more images predicted using the ML model, based on the one or more images, the additional training metadata, and the attack data;
   wherein the ML model uses the additional training metadata to prevent the attack data from changing the object classification of the object.

10. The non-transitory computer-readable medium of claim 1, wherein the additional training metadata further comprises object relationship data for the object.

11. The non-transitory computer-readable medium of claim 3, wherein the object relationship data comprises a graph relating to the object depicted in the one or more images.

12. The non-transitory computer-readable medium of claim 9, wherein the attack data comprises adversarial attack data intended to change the object classification of the object by the ML model.

13. The non-transitory computer-readable medium of claim 9, wherein the ML model is trained using a multi-dimensional array relating to the training data and the additional training metadata.

14. The non-transitory computer-readable medium of claim 11, wherein the graph comprises a plurality of vertices and edges relating to sub-components of the object.

15. A system, comprising:
   a computer processor; and
   a memory having instructions stored thereon which, when executed on the computer processor, performs operations comprising:
      receiving, from the system, one or more images depicting an object at a machine learning (ML) model implemented by the system, wherein the ML model is trained using training data representing the object and additional training metadata relating to the object, the additional training metadata comprising temporal metadata that includes two or more training images depicting the object at different times;
      receiving, from the system, attack data at the ML model; and
      outputting, to the system, an object classification of the object depicted in the one or more images predicted using the ML model, based on the one or more images, the additional training metadata, and the attack data;
      wherein the ML model uses the additional training metadata to prevent the attack data from changing the object classification of the object.

16. The system of claim 14, wherein the additional training metadata further comprises object relationship data for the object.

17. The system of claim 7, wherein the object relationship data comprises a graph relating to the object depicted in the one or more images.

18. The system of claim 15, wherein the attack data comprises adversarial attack data intended to change the object classification of the object by the ML model.

19. The system of claim 15, wherein the ML model is trained using a multi-dimensional array relating to the training data and the additional training metadata.

20. The system of claim 17, wherein the graph comprises a plurality of vertices and edges relating to sub-components of the object.

* * * * *